US012747180B2

(12) United States Patent
Komatsu et al.

(10) Patent No.: US 12,747,180 B2
(45) Date of Patent: Sep. 29, 2026

(54) GLASS, CHEMICALLY STRENGTHENED GLASS, AND METHOD FOR PRODUCING GLASS HAVING CURVED SHAPE

(71) Applicant: AGC Inc., Tokyo (JP)

(72) Inventors: Hiroshi Komatsu, Tokyo (JP); Takanori Fukushi, Tokyo (JP); Satoshi Kanasugi, Tokyo (JP); Hitomi Furuta, Tokyo (JP); Shiro Funatsu, Tokyo (JP)

(73) Assignee: AGC Inc., Tokyo (JP)

( * ) Notice: Subject to any disclaimer, the term of this patent is extended or adjusted under 35 U.S.C. 154(b) by 743 days.

(21) Appl. No.: 18/171,509

(22) Filed: Feb. 20, 2023

(65) Prior Publication Data

US 2023/0202901 A1 Jun. 29, 2023

Related U.S. Application Data

(63) Continuation of application No. PCT/JP2021/029580, filed on Aug. 10, 2021.

(30) Foreign Application Priority Data

Aug. 24, 2020 (JP) ................................ 2020-141160

(51) Int. Cl.

| | |
|---|---|
| ***C03C 10/00*** | (2006.01) |
| ***C03B 23/03*** | (2006.01) |
| ***C03C 21/00*** | (2006.01) |
| *C03B 32/02* | (2006.01) |

(52) U.S. Cl.

CPC .............. *C03B 23/03* (2013.01); *C03C 10/00* (2013.01); *C03C 21/002* (2013.01); *C03B 32/02* (2013.01); *C03C 2204/00* (2013.01)

(58) Field of Classification Search

CPC ......... C03B 23/03; C03B 32/02; C03C 10/00; C03C 10/0009; C03C 10/0027; C03C 21/002; C03C 2204/00; C03C 3/087; C03C 3/097

See application file for complete search history.

(56) References Cited

U.S. PATENT DOCUMENTS

| | | | |
|---|---|---|---|
| 12,049,424 | B1 | 7/2024 | Beall et al. |
| 12,098,090 | B1 | 9/2024 | Beall et al. |
| 2009/0118113 | A1 | 5/2009 | Yagi |
| 2009/0162608 | A1 | 6/2009 | Yagi et al. |
| 2011/0136651 | A1 | 6/2011 | Yagi et al. |
| 2016/0081381 | A1 | 3/2016 | Medoff |
| 2016/0082022 | A1 | 3/2016 | Medoff |
| 2016/0102010 | A1 | 4/2016 | Beall et al. |
| 2016/0249662 | A1 | 9/2016 | Medoff |
| 2016/0262433 | A1 | 9/2016 | Medoff |
| 2016/0262434 | A1 | 9/2016 | Medoff |
| 2017/0144921 | A1 | 5/2017 | Beall et al. |
| 2018/0186686 | A1 | 7/2018 | Beall et al. |
| 2019/0071348 | A1 | 3/2019 | Beall et al. |
| 2020/0002221 | A1 | 1/2020 | Beall et al. |
| 2020/0029595 | A1 | 1/2020 | Medoff |
| 2020/0156994 | A1 | 5/2020 | Li et al. |
| 2020/0207660 | A1 | 7/2020 | Li et al. |
| 2020/0231491 | A1 | 7/2020 | Beall et al. |
| 2020/0239354 | A1 | 7/2020 | Li et al. |
| 2020/0346969 | A1 | 11/2020 | Li et al. |
| 2021/0002164 | A1 | 1/2021 | Beall et al. |
| 2021/0101824 | A1 | 4/2021 | Beall et al. |
| 2021/0101825 | A1 | 4/2021 | Beall et al. |
| 2021/0114919 | A1 | 4/2021 | Beall et al. |
| 2021/0114920 | A1 | 4/2021 | Beall et al. |
| 2021/0347682 | A1 | 11/2021 | Li et al. |
| 2022/0064054 | A1 | 3/2022 | Li et al. |
| 2023/0242437 | A1 | 8/2023 | Beall et al. |
| 2024/0239704 | A1 | 7/2024 | Beall et al. |
| 2024/0270626 | A1 | 8/2024 | Li et al. |
| 2025/0042804 | A1 | 2/2025 | Beall et al. |
| 2025/0178950 | A1 | 6/2025 | Li et al. |

FOREIGN PATENT DOCUMENTS

| | | | |
|---|---|---|---|
| CN | 110143759 | A | 8/2019 |
| CN | 111018356 | A | 4/2020 |
| CN | 111087174 | A | 5/2020 |
| JP | 35-16443 | B | 10/1960 |
| JP | 2009-11 4005 | A | 5/2009 |
| JP | 2010-1201 | A | 1/2010 |
| JP | 2017-530933 | A | 10/2017 |
| JP | 2020-33202 | A | 3/2020 |
| JP | 2020-108380 | A | 7/2020 |
| WO | WO-2019/167850 | A1 | 9/2019 |
| WO | WO 2019/172426 | A1 | 9/2019 |

OTHER PUBLICATIONS

International Search Report issued Nov. 2, 2021 in PCT/JP2021/029580 filed Aug. 10, 2021, 2 pages (English Translation).

*Primary Examiner* — Laura A Auer
(74) *Attorney, Agent, or Firm* — Oblon, McClelland, Maier & Neustadt, L.L.P.

(57) ABSTRACT

The present invention relates to a glass in which: the glass is a crystallized glass; the glass has a difference $\log \eta - \log \eta_0$ (dPa·s) between a logarithm $\log \eta$ (dPa·s) of bulk viscosity $\eta$ (dPa·s) and a logarithm $\log \eta_0$ (dPa·s) of local viscosity $\eta_0$ (dPa·s) of larger than 0 and 1.8 or smaller, in a temperature range in which the logarithm $\log \eta_0$ (dPa·s) of the bulk viscosity $\eta$ (dPa·s) is 11.4 or larger and 12.7 or smaller.

8 Claims, No Drawings

GLASS, CHEMICALLY STRENGTHENED GLASS, AND METHOD FOR PRODUCING GLASS HAVING CURVED SHAPE

CROSS-REFERENCE TO RELATED APPLICATIONS

This is a continuation of International Application No. PCT/JP2021/029580 filed on Aug. 10, 2021, and claims priority from Japanese Patent Application No. 2020-141160 filed on Aug. 24, 2020, the entire content of which is incorporated herein by reference.

TECHNICAL FIELD

The present invention relates to glass including a crystallized glass and, particularly, to a glass that has a curved shape and is suitable for a cover glass. The invention also relates to a manufacturing method of a glass including a crystallized glass and having a curved shape.

BACKGROUND ART

In recent years, it has become common to use a cover glass to protect the display surface of a display and improve its appearance also in mobile devices such as tablet PCs (personal computers) and smartphones (also hereinafter referred to as "smartphones etc.") and display devices such as liquid crystal TV (liquid crystal panels), organic EL panels, and touch panels (in this specification, these devices will be hereinafter referred to generically as "display devices etc.").

To satisfy design-related requirements such as improvement in design performance, a high-class feel, and conformity to interior design or main body design, there may occur a case that a portion in which a cover glass of a display device or the like as mentioned above is arranged has a curved shape. In this case, it is preferable that the cover glass also has a curved shape.

Among manufacturing methods of a glass having a curved shape is, for example, a manufacturing method of placing a flat glass sheet on a molding die having a curved shape and softening the glass sheet by heating it to its softening temperature or higher to thereby cause it to deform by its own weight so as to conform to the shape of the molding die (Patent document 1).

CITATION LIST

Patent Literature

Patent document 1: JP-B-S35-16443

SUMMARY OF INVENTION

Technical Problems

To obtain a glass that is excellent in design performance, it is necessary to increase the shape accuracy and the surface quality in a well-balanced manner. To increase the shape accuracy in shaping of a glass, it is necessary to shape it in a low viscosity range. However, when shaping a glass in a low viscosity range, there is a problem that the surface quality is deteriorated. On the other hand, to enhance the surface quality in shaping of a glass, it is necessary to shape the glass in a high viscosity range. However, there is a problem that excessive bending stress acts on the glass during shaping to thereby occur cracking.

An object of the present invention is therefore to provide glass including a crystallized glass and being excellent in shape accuracy and surface quality and a manufacturing method of a glass including a crystallized glass and having a curved shape.

Solution to Problem

The present inventors have studied to solve the above problems, and therefore find out that cracking that occurs at the time of bending in a high viscosity range can be suppressed by producing a difference between bulk material viscosity and local viscosity by mixing particles into amorphous portions of glass, the completed the invention.

The present invention relates to a glass in which:

the glass is a crystallized glass; the glass has a difference log $\eta$−log $\eta_0$ (dPa·s) between a logarithm log $\eta$ (dPa·s) of bulk viscosity $\eta$ (dPa·s) defined below and a logarithm log $\eta_0$ (dPa·s) of local viscosity $\eta$ (dPa·s) defined below of larger than 0 and 1.8 or smaller, in a temperature range in which the logarithm log $\eta$ (dPa·s) of the bulk viscosity $\eta$ (dPa·s) is 11.4 or larger and 12.7 or smaller, bulk viscosity $\eta$: viscosity of the entire glass measured by a penetration method or a parallel plate method, local viscosity $\eta_0$: viscosity of an amorphous portion of the glass determined according to the following Equation (1) in a case where a crystallinity of the glass is 0.4 or lower, and according to the following Equation (2) in a case where the crystallinity of the glass is larger than 0.4, from the bulk viscosity and a volume fraction of particles; and in the following Equation (1), d is an average particle diameter, $S_r$ is a specific surface area of particles per unit volume, $\phi_v$ is a volume concentration, and $\phi_{vc}$ is a marginal maximum volume concentration; in the following Equation (2), $\phi_v$ is a volume concentration; and in each of the following Equations (1) and (2), in a case of a crystallized glass, the volume concentration represented by $\phi_v$ means crystallinity.

[Formulae 1]

$$\frac{\eta}{\eta_0} = 1 + \frac{d \cdot S_r}{2} \cdot \frac{1}{1/\varphi_v - 1/\varphi_{vc}} = 1 + \frac{3}{1/\varphi_v - 1/0.52} \tag{1}$$

$$\frac{\eta}{\eta_0} = (1 - \varphi_v)^{-2.5} \tag{2}$$

The present invention relates to a glass including a crystallized glass, in which the glass has a peak value of a loss tangent tan $\delta$ that is expressed as a ratio G"/G' of a ratio of a loss shear modulus G" to a storage shear modulus G' of a glass sample having a longitudinal of 35 mm, a horizontal of 8 mm and a thickness of 2 mm and that is measured by the following method of 0.7 or larger:

loss tangent tan $\delta$ measuring method: a measurement is carried out in a shear measurement mode at a frequency of 1.0 Hz under conditions of a strain amount of 0.01% and a temperature increase rate of 10° C./min using a dynamic viscoelasticity measuring instrument "MCR502" (rheometer)/"CTD-1000" (temperature adjusting system) produced by Anton Paar GmbH.

The present invention relates to a manufacturing method of a glass having a curved shape, the method including shaping a curved surface by applying an external force to the glass while the glass is held in a temperature range in which a logarithm log η (dPa·s) of bulk viscosity η (dPa·s) defined below is 11.4 or larger and 12.7 or smaller, in which:

the glass includes a crystallized glass, and has a difference log η−log $\eta_0$ (dPa·s) between the logarithm log η (dPa·s) of the bulk viscosity η (dPa·s) and a logarithm log $\eta_0$ (dPa·s) of local viscosity $\eta_0$ (dPa·s) defined below of larger than 0 and 1.8 or smaller, in a temperature range in which the logarithm log η (dPa·s) of the bulk viscosity η (dPa·s) is 11.4 or larger and 12.7 or smaller, bulk viscosity η: viscosity of the entire glass measured by a penetration method or a parallel plate method, local viscosity $\eta_0$: viscosity of an amorphous portion of the glass determined according to the following Equation (1) in a case where a crystallinity of the glass is 0.4 or lower, and according to the following Equation (2) in a case where the crystallinity of the glass is larger than 0.4, from the bulk viscosity and a volume fraction of particles; and in the following Equation (1), d is an average particle diameter, $S_r$ is a specific surface area of particles per unit volume, $\phi_v$ is a volume concentration, and $\phi_{vc}$ is a marginal maximum volume concentration; in the following Equation (2), $\phi_v$ is a volume concentration; and in each of the following Equations (1) and (2), in a case of crystallized glass, the volume concentration represented by $\phi_v$ means crystallinity.

[Formulae 2]

$$\frac{\eta}{\eta_0} = 1 + \frac{d \cdot S_r}{2} \cdot \frac{1}{1/\varphi_v - 1/\varphi_{vc}} = 1 + \frac{3}{1/\varphi_v - 1/0.52} \quad (1)$$

$$\frac{\eta}{\eta_0} = (1 - \varphi_v)^{-2.5} \quad (2)$$

The present invention relates to a manufacturing method of a glass having a curved shape, the method including shaping a curved surface by applying an external force to the glass while the glass is held in a temperature range in which a logarithm log η (dPa·s) of bulk viscosity η (dPa·s) defined below is 11.4 or larger and 12.7 or smaller, in which:

the glass includes a crystallized glass, and has a peak value of a loss tangent tan δ that is expressed as a ratio G"/G' of a ratio of a loss shear modulus G" to a storage shear modulus G' of a glass sample having a longitudinal of 35 mm, a horizontal of 8 mm and a thickness of 2 mm and that is measured by the following method is 0.7 or larger:

bulk viscosity η: viscosity of the entire glass measured by a penetration method or a parallel plate method, loss tangent tan δ measuring method: a measurement is carried out in a shear measurement mode at a frequency of 1.0 Hz under conditions of a strain amount of 0.01% and a temperature increase rate of 10° C./min using a dynamic viscoelasticity measuring instrument "MCR502" (rheometer)/"CTD-1000" (temperature adjusting system) produced by Anton Paar GmbH.

Advantageous Effects of Invention

The invention provides glass including a crystallized glass and being excellent in shape accuracy and surface quality, and a manufacturing method of a glass that includes a crystallized glass and has a curved shape. In the glass including the crystallized glass according to the present invention, cracking that occurs at the time of bending in a high viscosity range can be suppressed by decreasing the bending stress acting on the glass during shaping because the difference between bulk material viscosity and local viscosity is in a particular range. Thus, the glass according to the present invention is excellent in shape accuracy and surface quality. The manufacturing method according to the present invention can manufacture a glass having a curved shape that is excellent in shape accuracy and surface quality by shaping a curved surface by applying external force to a glass including a crystallized glass whose viscosity is in a particular range.

DESCRIPTION OF EMBODIMENTS

In the present specification, the symbol or the word "to" is used in such a sense that a numerical value range concerned includes numerical values written before and after it as a lower limit value and an upper limit value, respectively, unless otherwise specified.

In the present specification, the term "bulk viscosity η" means viscosity of the entire glass and is measured by the following method:

(Measuring Method of Bulk Viscosity η)

A measurement is performed by a penetration method or a parallel plate method.

An example measurement method is as follows:

Measuring instrument: "WRVM-313" produced by OPT Corp.;

Sample: diameter of 10 mm×6 mm; and

Measurement conditions: 10° C./min from room temperature to (Tg−50°) C. and 5° C./min in a measurement temperature range.

It is noted that in the present specification the symbol "Tg" means a glass transition temperature.

In the present specification, "local viscosity $\eta_0$" means viscosity of the amorphous portion in the case where the glass includes the amorphous portion and the particle.

(How to Determine Local Viscosity η)

In the case where the crystallinity of the glass is 0.4 or lower, that is, the volume concentration or volume fraction is 40% or smaller, from the bulk viscosity and the volume fraction of particles, local viscosity $\eta_0$ is determined according to the following Equation (1) (i.e., local viscosity estimation equation (Mori-Ototake equation); see Yoshiro Mori and Naoshi Ototake: "About Viscosity of a Suspension," Chemical Engineering, Vol. 20, No. 9, pp. 16-22, 1956). The following Equation (1) is an equation obtained by assuming that equal-diameter spherical particles and loosest packing to be a maximum volume concentration. In the following Equation (1), d is the average particle diameter, $S_r$ is the specific surface area of particles per unit volume, $\phi_v$ is the volume concentration, and $\phi_{vc}$ is the marginal maximum volume concentration.

In the case where the crystallinity of the glass is larger than 0.4, that is, the volume concentration or volume fraction is larger than 40%, local viscosity $\eta_0$ is determined according to the following Equation (2) (i.e., local viscosity estimation equation; see Brinkman, H. C.: "The Viscosity of Concentrated Suspensions and Solutions," Jour. of Chem. Phys., Vol. 20, No. 4, p. 571, April, 1952). The following Equation (2) is a theoretical equation obtained by extending the Einstein's equation to the case of a broad volume fraction. In the following Equation (2), $\phi_v$ is the volume concentration.

[Formulae 3]

$$\frac{\eta}{\eta_0} = 1 + \frac{d \cdot S_r}{2} \cdot \frac{1}{1/\varphi_v - 1/\varphi_{vc}} = 1 + \frac{3}{1/\varphi_v - 1/0.52} \quad (1)$$

$$\frac{\eta}{\eta_0} = (1 - \varphi_v)^{-2.5} \quad (2)$$

For example, viscosity is measured under the following conditions:

Instrument: "WRVM-313" produced by OPT Corp.;

Sample: diameter of 10 mm×6 mm; and

Measurement conditions: 10° C./min from room temperature to (Tg−50°) C. and 5° C./min in a measurement temperature range.

In the present specification, the term "amorphous glass" means glass in which no diffraction peaks indicating a crystal are found by a powder X-ray diffraction method (described later). "Crystallized glass" is obtained by precipitating crystals by subjecting the "amorphous glass" to heating treatment, and contains crystals. In the present specification "amorphous glass" and "crystallized glass" may together be referred to as "glass." Furthermore, amorphous glass to be turned to crystallized glass by heating treatment may be referred to as "mother glass of crystallized glass."

In the present specification, a "loss tangent tan δ" is a value that is measured by the following method.

(Measurement Method of Loss Tangent Tan δ)

A measurement is carried out in a shear measurement mode at a frequency of 1.0 Hz under the conditions of a strain amount of 0.01% and a temperature increase rate of 10° C./min using a dynamic viscoelasticity measuring instrument "MCR502" (rheometer)/"CTD-1000" (temperature adjusting system) produced by Anton Paar GmbH.

In the present specification, a powder X-ray diffraction measurement is performed in a 2θ range of 10° to 80° using a CuKα line. In the case where a diffraction peak appears, a precipitated crystal is identified by the Hanawalt method. Among crystals that have been identified by this method, a crystal that is identified by a peak group including a peak having a highest integration intensity is made as a main crystal.

For example, a powder X-ray diffraction measurement is performed under the following conditions:

Measuring instrument: "Smart Lab" produced by Rigaku Corporation; and

Scanning rate: 10°/min, step: 0.02°.

In the present specification, unless otherwise specified, a glass composition is expressed by mol % (in terms of oxides) that is written as "%" for simplicity.

Furthermore, in the present specification, the expression "substantially not containing" means that the content is lower than or equal to impurity levels in raw materials etc., that is, a material concerned is not one that is added intentionally. More specifically, the content is lower than 0.1%, for example.

In the following, the term "chemically strengthened glass" means the glass that has been subjected to chemical strengthening treatment.

In the present specification, the term "stress profile" means a compressive stress value profile having the depth from the glass surface as a variable. In a stress profile, tensile stress is expressed as a negative compressive stress.

A "compressive stress value (CS)" can be measured by obtaining a flake from a cross section of the glass and analyzing the flake sample with a birefringence imaging system. A birefringence stress meter of a birefringence imaging system is an instrument for measuring a magnitude of retardation caused by stress using a polarization microscope, a liquid crystal compensator, etc., and examples of it include a birefringence imaging system "Abrio-IM" produced by CRi, Inc.

A CS may also be measured utilizing scattered light photoelasticity. This method can measure a CS by entering light from a glass surface and analyzing polarization of scattered light. Examples of stress measuring instrument utilizing scattered light photoelasticity include a scattered light photoelastic stress meter "SLP-2000" produced by Orihara Industrial Co., Ltd.

In the present specification, the term "compressive stress layer depth (DOL)" is a depth at which the compressive stress value becomes equal to 0. In the following, the surface compressive stress value and the compressive stress value at a depth 50 μm may be referred to as $CS_0$ and $CS_{50}$, respectively. Furthermore, the term "internal tensile stress (CT)" means a tensile stress at a depth t/2 where t is the glass thickness.

In the present specification, the term "light transmittance" means an average transmittance of light in a wavelength range of 380 to 780 nm. Furthermore, a "haze value" is measured according to JIS K7136: 2000 using a C light source.

In the present specification, the term "fracture toughness value" means a value measured by the IF method that is prescribed in JIS R1607: 2015.

Glass, First Embodiment

One embodiment (first embodiment) of the present invention is glass that is crystallized glass and is characterized in that the difference $\log \eta - \log \eta_0$ (dPa·s) between the logarithm $\log \eta$ (dPa·s) of bulk viscosity $\eta$ (dPa·s) (defined below) and the logarithm $\log \eta_0$ (dPa·s) of local viscosity $\eta_0$ (dPa·s) (defined below) is larger than 0 and 1.8 or smaller in a temperature range in which the logarithm $\log \eta$ (dPa·s) of the bulk viscosity $\eta$ (dPa·s) is 11.4 or larger and 12.7 or smaller.

The temperature range in which the logarithm $\log \eta$ (dPa·s) of bulk viscosity (dPa·s) is 11.4 or larger and 12.7 or smaller is a temperature range including a temperature range in which glass is shaped conventionally and a temperature range in which glass becomes highly viscous. In the case where $\log \eta - \log \eta_0$ (dPa·s) is larger than 0 and 1.8 or smaller in the temperature range, a viscosity variation due to a temperature variation is decreased, thereby suppressing cracking that occurs at the time of bending in a high viscosity range and increasing the shape accuracy and surface quality. It is preferable that the above-mentioned difference $\log \eta - \log \eta_0$ (dPa·s) be 0.1 or larger, more preferably 0.2 or larger. And it is preferable that $\log \eta - \log \eta_0$ (dPa·s) be 1.2 or smaller, more preferably 0.8 or smaller, and further preferably 0.6 or smaller. Combining these requirements, it is preferable that the $\log \eta - \log \eta_0$ (dPa·s) be 0.1 or larger and 1.2 or smaller, more preferably 0.1 or larger and 0.8 or smaller, and further preferably 0.2 or larger and 0.6 or smaller.

The glass according to the present embodiment is the crystallized glass and, as described later, includes the amorphous portion and particles that are mixed in the amorphous portion. Mixing particles in the amorphous portion makes it possible to produce a difference between the bulk viscosity $\eta$ and the local viscosity $\eta_0$, and to suppress cracking more that occurs at the time of bending in a high viscosity range. The manner of mixing of particles may be either nonuniform or uniform over the entire amorphous portion.

It is preferable that at least one of diameters measured by the following methods of the particles mixed in the amorphous portion be 10 nm or larger, more preferably 20 nm or larger, further preferably 30 nm or larger, and particularly preferably 40 nm or larger. In the case where the diameter is 10 nm or larger, it is possible to produce a difference between the bulk viscosity $\eta$ and the local viscosity $\eta_0$, and to thereby suppress cracking more that occurs at the time of bending in a high viscosity range. There are no particular limitations on the particle diameter, it is preferable from the viewpoints of the light transmittance and haze value that the particle diameter be 60 nm or smaller.

(Particle Diameter Measuring Method)

An average particle diameter of precipitated crystals can be calculated from powder X-ray diffraction intensity using the Rietveld method.

It is preferable that the particle shape be spherical or elliptical, and spherical particles and spheroidal particles may be used in mixture. In the case where the particle shape is spherical or elliptical, it is preferable that the length ratio that is represented by longer-axis/shorter-axis, which is measured by the following method, be 1 or larger and 5.1 or smaller, more preferably 1 or larger and 4 or smaller and further preferably 2 or larger and 4 or smaller. In the case where the longer-axis/shorter-axis is 1 or larger and 5.1 or smaller, the bending strength can be increased and cracking that occurs at the time of bending can be suppressed more.

(Longer-Axis/Shorter-Axis Measuring Method)

A measurement is carried out by the following method using a cryo-TEM (transmission electron microscope) image.

An external shape of lattice-fringe-observed particles existing in a field of view of a 350-nm square is extracted and a length ratio of longer-axis to shorter-axis is calculated.

From the viewpoints of the light transmittance and haze value, the volume fraction of the particles with respect to the entire glass be 80% or smaller, more preferably 60% or smaller, further preferably 40% or smaller, even further preferably 30% or smaller, and particularly 25% or smaller. From the viewpoint of obtaining the advantage of making it possible to produce a difference between the bulk viscosity $\eta$ and the local viscosity $\eta_0$ and thereby more suppress cracking that occurs at the time of bending in a high viscosity range, it is preferable that the volume fraction be 10% or larger. A volume fraction is measured by the following method.

(Volume Fraction Measuring Method)

A calculation is performed from a powder X-ray diffraction result by the Rietveld method.

The above-described particles are not limited to crystal particles precipitated from amorphous portion and may be, for example, glass particles or SiC particles if the glass is not limited to crystallized glass. Among these kinds of particles, crystal particles precipitated from amorphous portion are preferable from the viewpoint that they can provide, sufficiently and simply, the effects of lowering the degree of reduction of the light transmittance due to reflection and scattering at the interfaces between the particles and the amorphous portion and increasing the fracture toughness value at the interfaces.

In the case where the above-described particles are crystal particles precipitated from amorphous portion, the glass becomes crystallized glass of the first embodiment. Thus, the glass according to a preferable embodiment of the first embodiment is the glass including the crystallized glass and having a curved shape, and has the feature that the difference $\log\eta - \log\eta_0$ (dPa·s) between the logarithm $\log\eta$ (dPa·s) of bulk viscosity $\eta$ (dPa·s) and the logarithm $\log\eta_0$ (dPa·s) of local viscosity $\eta_0$ (dPa·s) is larger than 0 and 1.8 or smaller in a temperature range in which the logarithm $\log\eta$ (dPa·s) of the bulk viscosity $\eta$ (dPa·s) is 11.4 or larger and 12.7 or smaller. However, although the glass according to the first embodiment is crystallized glass, a case that the particles are glass particles and a case that the particles are SiC particles are not excluded at all.

«Glass Composition»

In the first embodiment, it is preferable that the glass composition include, in mol % in terms of oxides, 40% to 90% of $SiO_2$, 0% to 15% of $Al_2O_3$, and 0% to 35% of $Li_2O$, $Na_2O$, and $K_2O$ in total. A preferable glass composition of a case that the glass is crystallized glass will be described later.

Glass, Second Embodiment

Another embodiment (second embodiment) of the present invention is glass that is crystallized glass and is characterized in that the peak value of the loss tangent tan $\delta$ that is expressed as the ratio G"/G' of a ratio of the loss shear modulus G" to the storage shear modulus G' of a glass sample (35 mm of longitudinal×8 mm of horizontal×2 mm of thickness) and that is measured by the following method is 0.7 or larger. In the case where the peak value of the loss tangent tan $\delta$ is 0.7 or larger, the elastic stress inside the glass during bend shaping is suppressed, thereby suppressing occurrence of glass cracking. It is preferable that the peak value of the loss tangent tan $\delta$ be 0.9 or larger, more preferably 0.95 or larger and further preferably 1.0 or larger.

(Loss Tangent Tan $\delta$ Measuring Method)

A measurement is carried out in a shear measurement mode at a frequency of 1.0 Hz under the conditions of a strain amount of 0.01% and a temperature increase rate of 10° C./min using a dynamic viscoelasticity measuring instrument "MCR502" (rheometer)/"CTD-1000" (temperature adjusting system) produced by Anton Paar GmbH.

Although there are no particular limitations on the upper limit of the peak value of the loss tangent tan s, it is preferable that it be 15.0 or smaller because in that case the contribution ratio of viscosity is small, whereby even in a high viscosity range stress relief occurs fast and stress that may cause glass cracking is not prone to be generated even when external force for bend shaping is exerted on the glass.

«Crystallized Glass»

It is preferable that the crystallized glass according to the present embodiment (hereinafter also abbreviated as "the present crystallized glass") include at least one kind selected from the group consisting of an $Li_3PO_4$ crystal, an $Li_4SiO_4$ crystal, an $Li_2SiO_3$ crystal, an $Li_2Mg(SiO_4)$ crystal, and an $Li_2Si_2O_4$ crystal. In the case where any kind of these crystals is employed as a main crystal, the light transmittance becomes high and the haze value becomes small. The present crystallized glass may either include two or more kinds of an $Li_3PO_4$ crystal, an $Li_4SiO_4$ crystal, an $Li_2SiO_3$ crystal, an $Li_2Mg(SiO_4)$ crystal, and an $Li_2Si_2O_4$ crystal or include one kind of these crystals as a main crystal. Alternatively, a solid solution crystal of two or more kinds selected from the group consisting of an $Li_3PO_4$ crystal, an $Li_4SiO_4$ crystal, an $Li_2SiO_3$ crystal, an $Li_2Mg(SiO_4)$ crystal, and an $Li_2Si_2O_4$ crystal may be made a main crystal.

To increase the mechanical strength, it is preferable that the crystallization ratio of the present crystallized glass be 5% or larger, more preferably 10% or larger, further preferably 15% or larger, and particularly preferably 20% or larger.

To increase the strength, it is preferable that the average particle diameter of precipitated crystals of the present crystallized glass be 5 nm or larger, more preferably 10 nm or larger. To increase the transparency, it is preferable that the average particle diameter be 80 nm or smaller, more preferably 60 nm or smaller, further preferably 50 nm or smaller, particularly preferably 40 nm or smaller, and most preferably 30 nm or smaller. An average particle diameter of precipitated crystals is determined from a transmission electron microscope (TEM) image.

The present crystallized glass is obtained by crystallizing amorphous glass (described later) by subjecting it to heating treatment.

«Glass Composition of Crystallized Glass»

It is preferable that the present crystallized glass satisfy that it includes, in mol % in terms of oxides, 40% to 70% of $SiO_2$;
10% to 35% of $Li_2O$;
4% to 15% of $Al_2O_3$;
0.5% to 5% of $P_2O_5$;
1.5% to 5% of $ZrO_2$;
0% to 10% of $B_2O_3$;
0% to 3% of $Na_2O$;
0% to 2% of $K_2O$;
0% to 4% of $SnO_2$; and
0% to 10% of MgO.

Furthermore, in the present crystallized glass, it is preferable that the total content of $SiO_2$, $Al_2O_3$, $P_2O_5$, and $B_2O_3$ accounts for 60% to 80% in mol % in terms of oxides. $SiO_2$, $Al_2O_3$, $P_2O_5$, and $B_2O_3$ are network formers (hereinafter referred to as "NWF") of the glass. The strength of the glass is high in the case where the total content of the NWF is high. Since the fracture toughness value of the crystallized glass is thereby increased, it is preferable that the total content of the NWF be 60% or higher, more preferably 63% or higher, and further preferably 65% or higher. On the other hand, from the viewpoint of manufacturability such as preventing the melting temperature from becoming too high, it is preferable that the total content of the NWF be 80% or lower, more preferably 75% or lower, and further preferably 70% or lower.

In the present crystallized glass, it is preferable that the ratio of the total content of $Li_2O$, $Na_2O$, and $K_2O$ to that of the NWF, that is, $SiO_2$, $Al_2O_3$, $P_2O_5$, and $B_2O_3$, be 0.20 to 0.60.

Since $Li_2O$, $Na_2O$, and $K_2O$ are network modifiers, decreasing their ratio to the NWFs increases interstices in a network and hence increases the impact resistance. Thus, it is preferable that the ratio of the total content of $Li_2O$, $Na_2O$, and $K_2O$ to that of the NWF be 0.60 or smaller, more preferably 0.55 or smaller, and particularly preferably 0.50 or smaller. On the other hand, since $Li_2O$, $Na_2O$, and $K_2O$ are components that are necessary at the time of chemical strengthening, to enhance the chemically strengthening properties, it is preferable that the ratio of the total content of $Li_2O$, $Na_2O$, and $K_2O$ to that of the NWF be 0.20 or larger, more preferably 0.25 or larger, and particularly preferably 0.30 or larger.

Further descriptions of the above glass composition will be made below.

$SiO_2$ is a component for formation of a glass network structure. $SiO_2$ is also a component for increasing the chemical durability, its content is preferably 40% or higher, more preferably 45% or higher, further preferably 48% or higher, even further preferably 50% or higher, particularly preferably 52% or higher, and extremely preferably 54% or higher. On the other hand, to increase the meltability, its content is preferably 70% or lower, more preferably 68% or lower, further preferably 66% or lower, and particularly preferably 64% or lower.

$Al_2O_3$ is a component for increasing the surface compressive stress that is produced by the chemical strengthening in doing chemical strengthening. It is preferable that the content of $Al_2O_3$ be 4% or higher, more preferably 5% or higher, further preferably 5.5% or higher, even further preferably 6% or higher, particularly preferably 6.5% or higher, and most preferably 7% or higher. On the other hand, to prevent the devitrification temperature from becoming too high, it is preferable that the content of $Al_2O_3$ be 15% or lower, more preferably 12% or lower, further preferably 10% or lower, particularly preferably 9% or lower, and most preferably 8% or lower.

$Li_2O$ is indispensable because it is a component for producing surface compressive stress by ion exchange and is a component constituting a main crystal. It is preferable that the content of $Li_2O$ be 10% or higher, more preferably 14% or higher, further preferably 20% or higher, and particularly preferably 22% or higher. On the other hand, to keep the glass stable, it is preferable that the content of $Li_2O$ be 35% or lower, more preferably 32% or lower, and further preferably 30% or lower.

$Na_2O$ is a component for increasing the glass meltability. Although $Na_2O$ is not indispensable, in the case where it is included, its content is preferably 0.5% or higher, more preferably 1% or higher, and particularly preferably 2% or higher. In the case where the content of $Na_2O$ is too high, crystals such as a main crystal $Li_3PO_4$ do not precipitate easily and the chemically strengthening properties deteriorate. Thus, it is preferable that the content of $Na_2O$ be 3% or lower, more preferably 2% or lower, and further preferably 1% or lower.

$K_2O$ is a component for lowering the glass melting temperature like $Na_2O$ and hence may be included. In the case where $K_2O$ is included, its content is preferably 0.5% or higher, more preferably 1% or higher, and further preferably 1.5% or higher. In the case where the content of $K_2O$ is too high, the chemically strengthening properties lowers or the chemical durability lowers. Thus, it is preferable that the content of $K_2O$ be 2% or lower, most preferably 1% or lower.

To increase the meltability of glass materials, the total content $Na_2O+K_2O$ of $Na_2O$ and $K_2O$ is preferably 1% or higher, more preferably 2% or higher.

The ratio $K_2O/R_2O$ of the content of $K_2O$ to the total content (hereinafter referred to as $R_2O$) of $Li_2O$, $Na_2O$, and $K_2O$ being 0.2 or smaller is preferable because in that case the chemically strengthening properties can be enhanced and the chemical durability can be increased. It is more preferable that $K_2O/R_2O$ be 0.15 or smaller, further preferably 0.10 or smaller.

In addition, it is preferable that $R_2O$ be 10% or higher, more preferably 15% or higher, further preferably 20% or higher. On the other hand, it is preferable that $R_2O$ be 35% or lower, more preferably 29% or lower, and further preferably 26% or lower.

$P_2O_5$ is a component constituting the $Li_3PO_4$ crystal and hence is indispensable. To accelerate crystallization, it is preferable that the content of $P_2O_5$ be 0.5% or higher, more preferably 1% or higher, further preferably 1.5% or higher, particularly preferably 2% or higher, and extremely preferably 2.5% or higher. On the other hand, in the case where the content of $P_2O_5$ is too high, phase separation is prone to occur at the time of melting and the acid resistance lowers very much. Thus, it is preferable that the content of $P_2O_5$ be 5% or lower, more preferably 4.8% or lower, further preferably 4.5% or lower, and particularly preferably 4.2% or lower.

It is preferable that $ZrO_2$ be included because it is a component for increasing the mechanical strength and the chemical durability. It is preferable that the content of $ZrO_2$ be 1.5% or higher, more preferably 2% or higher, and further preferably 2.5% or higher. On the other hand, to suppress devitrification at the time of melting, it is preferable that the content of $ZrO_2$ be 5% or lower, more preferably 4.5% or lower, further preferably 4% or lower, and particularly preferably 3.5% or lower.

To increase the chemical durability, it is preferable that $ZrO_2/R_2O$ be 0.10 or larger, more preferably 0.15 or larger. To increasing the transparency after crystallization, it is preferable that $ZrO_2/R_2O$ be 0.6 or smaller, more preferably 0.4 or smaller.

$TiO_2$ may be included because it is a component for accelerating crystallization. Although $TiO_2$ is not indispensable, in the case where it is included its content is preferably 0.2% or higher, more preferably 0.5% or higher. On the other hand, to prevent devitrification at the time of melting, it is preferable that the content of $TiO_2$ be 4% or lower, more preferably 2% or lower, and further preferably 1% or lower.

$SnO_2$ may be included because it has a function of accelerating generation of crystal nuclei. Although $SnO_2$ is not indispensable, in the case where it is included, its content is preferably 0.5% or higher, more preferably 1% or higher, further preferably 1.5% or higher, and particularly preferably 2% or higher. On the other hand, to suppress devitrification at the time of melting, it is preferable that the content of $SnO_2$ be 4% or lower, more preferably 3% or lower.

$Y_2O_3$ may be included because it is a component that provides an effect of making fragments less prone to scatter when chemically strengthened glass fractures. It is preferable that the content of $Y_2O_3$ be 1% or higher, more preferably 1.5% or higher, further preferably 2% or higher, particularly preferably 2.5% or higher, and extremely preferably 3% or higher. On the other hand, to suppress devitrification at the time of melting, it is preferable that the content of $Y_2O_3$ be 5% or lower, more preferably 4% or lower.

$B_2O_3$ may be included because it is a component for increasing the glass chipping resistance and the meltability. To increase the meltability, in the case where $B_2O_3$ is included, its content is preferably 0.5% or higher, more preferably 1% or higher, and further preferably 2% or higher. On the other hand, in the case where the content of $B_2O_3$ is too high, the glass quality is prone to lower because of occurrence of striae or phase separation at the time of melting. Thus, it is preferable that the content of $B_2O_3$ be 10% or lower, more preferably 5% or lower, further preferably 4% or lower, even further preferably 3% or lower, and particularly preferably 2% or lower.

Each of BaO, SrO, MgO, CaO, and ZnO may be included because they are components for increasing the glass meltability. In the case where these components are included, it is preferable that the total content (hereinafter referred to as BaO+SrO+MgO+CaO+ZnO) of BaO, SrO, MgO, CaO, and ZnO be 0.5% or higher, more preferably 1% or higher, further preferably 1.5% or higher, and particularly preferably 2% or higher. On the other hand, since in the case where total content is too high the ion exchange rate lowers, it is preferable that BaO+SrO+MgO+CaO+ZnO be 10% or lower, more preferably 8% or lower, further preferably 6% or lower, even further preferably 5% or lower, and particularly preferably 4% or lower.

Among these components, BaO, SrO, and ZnO may be included to decrease the haze value by increasing the light transmittance of crystallized glass by increasing the refractive index of residual glass so that it comes closer to a precipitated crystal phase. In this case, it is preferable that the total content (hereinafter referred to as BaO+SrO+ZnO) of BaO, SrO, and ZnO be 0.3% or higher, more preferably 0.5% or higher, further preferably 0.7% or higher, and particularly preferably 1% or higher. On the other hand, these components may lower the ion exchange rate. To obtain better chemically strengthening properties, it is preferable that BaO+SrO+ZnO be 2.5% or lower, more preferably 2% or lower, further preferably 1.7% or lower, and particularly preferably 1.5% or lower.

In the case where MgO is included, since MgO is necessary for precipitation of the $Li_2Mg(SiO_4)$ crystal, it is preferable that the content of MgO be 0.1% or higher, more preferably 4.0% or higher. On the other hand, to obtain better chemically strengthening properties, it is preferable that the content of MgO be 10% or lower, more preferably 5.4% or lower.

Each of $La_2O_3$, $Nb_2O_5$, and $Ta_2O_5$ may be included because it is a component for making fragments less prone to scatter when chemically strengthened glass fractures and increases the refractive index. In the case where these components are included, the total content of $La_2O_3$, $Nb_2O_5$, and $Ta_2O_5$ (hereinafter referred to as $La_2O_3$+$Nb_2O_5$) be 0.5% or higher, more preferably 1% or higher, further preferably 1.5% or higher, and particularly preferably 2% or higher. On the other hand, to make the glass less prone to devitrify at the time of melting, it is preferable that $La_2O_3$+$Nb_2O_5$+$Ta_2O_5$ be 4% or lower, more preferably 3% or lower, further preferably 2% or lower, and particularly preferably 1% or lower.

Furthermore, $CeO_2$ may be included. There may occur a case that $CeO_2$ suppresses coloration by oxidizing the glass. In the case where $CeO_2$ is included, its content is preferably 0.03% or higher, more preferably 0.05% or higher and further preferably 0.07% or higher. To obtain high transparency, it is preferable that the content of $CeO_2$ be 1.5% or lower, more preferably 1.0% or lower.

In the case where the glass is used in a state that it is colored, a colorant component may be added in such a content range as not to obstruct attainment of desired chemically strengthening properties. Examples of colorant component include $Co_3O_4$, $MnO_2$, $Fe_2O_3$, NiO, CuO, $Cr_2O_3$, $V_2O_5$, $Bi_2O_3$, $SeO_2$, $Er_2O_3$, and $Nd_2O_3$.

It is preferable that the content of the colorant component be 1% or lower in total. If it is desired to set the visible light transmittance of the glass higher, it is preferable that none of these components be contained substantially.

$SO_3$, a chloride, or a fluoride may be included as appropriate as a refining agent or the like in glass melting. It is preferable that no $As_2O_3$ be included. In the case where $Sb_2O_3$ is included, it is preferable that its content be 0.3% or lower, more preferably 0.1% or lower. It is most preferable that no $Sb_2O_3$ is included.

«Characteristics of the Present Crystallized Glass»

It is preferable that the light transmittance of the present crystallized glass be 85% or higher in the case where its thickness is 0.7 mm. If this condition is satisfied, a picture displayed on a portable display is easy to see in the case where the present crystallized glass is used as its cover glass. It is preferable that the light transmittance be 88% or higher, more preferably 90% or higher. Although it is preferable the light transmittance be as high as possible, usually the light transmittance is 91% or lower. In the case where the thickness is 0.7 mm, a light transmittance of 90% is equivalent to a light transmittance of ordinary amorphous glass.

In the case where an actual thickness is not 0.7 mm, a light transmittance of the case that the thickness is 0.7 mm can be calculated from a measurement value according to the Lambert-Beer law. Alternatively, in the case where the thickness t is larger than 0.7 mm, a measurement may be carried out after adjusting the thickness to 0.7 mm by polishing, etching, or the like.

In the case where the thickness is 0.7 mm, the haze value should be 0.5% or smaller, preferably 0.4% or smaller, more preferably 0.3% or smaller, further preferably 0.2% or smaller, and particularly preferably 0.15% or smaller. Although it is preferable the haze value be as small as possible, usually the haze value is 0.01% or larger. In the case where the thickness is 0.7 mm, a haze value of 0.02% is equivalent to a haze value of ordinary amorphous glass.

In the case where the crystallized glass having a thickness t (mm) has the total visible light transmittance of 100×T (%) and the haze value of 100×H (%), T can be expressed as $T=(1-R)^2\times\exp(-\alpha t)$ using a constant α by applying the Lambert-Beer law. Using the constant α, $dH/dt\propto\exp(-\alpha t)\times(1-H)$ holds.

That is, since it is considered that the haze value increases by an amount that is proportional to an internal linear transmittance every time the thickness increases, a haze value $H_{0.7}$ of the case that the thickness is 0.7 mm can be calculated according to the following equation:

$$H_{0.7} = 100\times\left[1-(1-H)^{\frac{\{(1-R)^2-T_{0.7}\}}{\{(1-R)^2-T\}}}\right]\ (\%)$$

In the case where the thickness t is larger than 0.7 mm, a measurement may be carried out after adjusting the thickness to 0.7 mm by polishing, etching or the like.

The present crystallized glass has a large fracture toughness value and is less prone to fracture violently even if a large compressive stress is formed therein by chemical strengthening. The fracture toughness value of the present crystallized glass is preferably 0.81 $MPa\cdot m^{1/2}$ or larger, more preferably 0.84 $MPa\cdot m^{1/2}$ or larger, and further preferably 0.87 $MPa\cdot m^{1/2}$ or larger, in which cases glass that is high in impact resistance can be obtained. Although there are no particular limitations on the upper limit of the fracture toughness value of the present crystallized glass, it should typically be 1.0 $MPa\cdot m^{1/2}$ or smaller.

For suppression of a warp during chemically strengthening treatment, it is preferable that the Young's modulus of the present crystallized glass be 80 GPa or larger, more preferably 85 GPa or larger, further preferably 90 GPa or larger, and particularly preferably 95 GPa or larger. There may occur a case that the present crystallized glass is used in a state that it has been polished. To facilitate polishing, it is preferable that the Young's modulus be 130 GPa or smaller, more preferably 120 GPa or smaller, and further preferably 110 GPa or smaller.

«Amorphous Glass»

The present crystallized glass is obtained by performing heating treatment on amorphous glass (amorphous glass employed in the present embodiment) that will be described below.

It is preferable that the amorphous glass employed in the present embodiment (hereinafter also abbreviated as "the present amorphous glass") include, in mol % in terms of oxides, 40% to 70% of $SiO_2$, 10% to 35% of $Li_2O$, 3% to 15% of $Al_2O_3$, 0% to 5% of $P_2O_5$, 1.5% to 5% of $ZrO_2$, 0% to 3% of $Na_2O$, and 0% to 1% of $K_2O$.

It is preferable that the present amorphous glass include, for example, such a composition as to contain, in mol % in terms of oxides, 40% to 70% of $SiO_2$, 10% to 32% of $Li_2O$, 5% to 15% of $Al_2O_3$, 0.5% to 5% of $P_2O_5$, 2% to 5% of $ZrO_2$, 0% to 10% of $B_2O_3$, 0% to 3% of $Na_2O$, 0% to 1% of $K_2O$, and 0% to 4% of $SnO_2$.

In the present amorphous glass, it is preferable that the total content of $SiO_2$, $Al_2O_3$, $P_2O_5$, and $B_2O_3$ be 60% to 80%. Furthermore, it is preferable that the ratio of the total content of $Li_2O$, $Na_2O$, and $K_2O$ to that of $SiO_2$, $Al_2O_3$, $P_2O_5$, and $B_2O_3$ be in a range of 0.20 to 0.60.

To prevent structural relief during chemical strengthening, it is preferable that the glass transition temperature Tg of the present amorphous glass be 400° C. or higher, more preferably 450° C. or higher and further preferably 500° C. or higher. On the other hand, it is preferable that the glass transition temperature Tg be 650° C. or lower, more preferably 600° C. or lower.

It is preferable that the difference Tc−Tg between a glass transition temperature Tg that is determined from a DSC curve obtained by using a differential scanning calorimeter and a crystallization peak temperature Tc that appears in a lowest temperature range in the DSC curve be 80° C. or larger, more preferably 85° C. or larger, further preferably 90° C. or larger, and particularly preferably 95° C. or larger. In the case where Tc−Tg is large, crystallized glass can be, for example, bent easily by re-heating it. It is preferable that Tc−Tg be 150° C. or smaller, more preferably 140° C. or smaller.

«Characteristics of the Present Glass»

In the glass according to each of the first embodiment and the second embodiment (hereinafter also abbreviated as "the present glass"), it is preferable that the slope $\Delta\log\eta/\Delta T$ (dPa·s/K) of the logarithm log η (dPa·s) of bulk viscosity η (dPa·s) be −0.035 or larger, more preferably −0.023 or larger, further preferably −0.02 or larger, and even further preferably −0.015 or larger in a temperature range in which the logarithm log η (dPa·s) of the bulk viscosity η (dPa·s) is 11.4 or larger and 12.7 or smaller. In the case where the above slope $\Delta\log\eta/\Delta T$ (dPa·s/K) is −0.035 or larger, the rate of viscosity change with respect to a temperature change is stable and hence the formability can be increased. In the case where the slope of the viscosity is too large, the viscosity goes out of an expected range due to a slight temperature change, as a result of which glass fracture is prone to occur in a high viscosity range and surface alteration is prone to occur in a low viscosity range. Although there are no particular limitations on the upper limit of the above-mentioned slope $\Delta\log\eta/\Delta T$ (dPa·s/K) of viscosity, it is typically −0.005 or smaller.

In the present glass, it is preferable that the logarithm log η (dPa·s) of the bulk viscosity η (dPa·s) at a temperature at which the crystal nuclei growth rate takes a peak value be 12.7 or smaller, more preferably 12.0 or smaller, further preferably 11.4 or smaller, and even further preferably 11.0 or smaller. In the case where the logarithm log η (dPa·s) of the bulk viscosity η (dPa·s) at a temperature at which the crystal nuclei growth rate takes a peak value is 12.7 or smaller, nuclei do not grow easily during shaping, variations of physical properties with respect to a temperature variation are suppressed, and the formability can be increased.

Although there are no particular limitations on the lower limit of the logarithm log η (dPa·s) of the bulk viscosity η (dPa·s) at a temperature at which the crystal nuclei growth rate takes a peak value, it is typically 4.0 or larger.

In the case where the present glass is shaped like a sheet, it is preferable that the thickness t of the present glass be 3 mm or smaller, the degree of preference increasing as the thickness t decreases in order of 2 mm or smaller, 1.6 mm or smaller, 1.1 mm or smaller, 0.9 mm or smaller, 0.8 mm or smaller, and 0.7 mm or smaller. To obtain sufficient strength by chemically strengthening treatment, it is preferable that the thickness t be 0.3 mm or larger, more preferably 0.4 mm or larger, and further preferably 0.5 mm or larger.

Examples of shape of the present glass include a flat sheet shape having a uniform thickness and a three-dimensional shape at least part of which is a curved portion, a bent portion, or the like and that is employed in a 2.5D cover glass, a 3D cover glass, etc. as typically employed in smartphones. The above-mentioned preferable range of the thickness of the present glass is also applicable as a preferable thickness range of chemically strengthened glass described later.

In the case where the present glass is a glass having such a three-dimensional shape, it can exhibit the effects of increasing the shape accuracy and the surface quality particularly easily. Examples of three-dimensional glass include a three-dimensional glass consisting of plural round shapes having a minimum round shape whose average radius of curvature is $5.0\times10^2$ mm or smaller and a maximum round shape whose average radius of curvature is $1.0\times10^3$ mm or larger. More specific examples include glass sheets that are rectangular in a plan view such as a three-dimensional glass in which two confronting sides have a curved shape and a three-dimensional glass in which a peripheral portion including the four respective corners has a curved shape.

«Chemically Strengthened Glass»

The glass according to the present invention may be chemically strengthened glass (hereinafter also abbreviated as "the present strengthened glass") obtained by chemically strengthening treatment. It is preferable that the haze value, as converted to a thickness 0.7 mm, of the present strengthened glass be 0.5% or smaller. The haze value and the light transmittance of the present glass are basically the same as those of glass before being subjected to chemical strengthening.

It is preferable that the surface compressive stress value ($CS_0$) of the present strengthened glass be 400 MPa or larger because such chemically strengthened glass does not fracture easily by deformation such as a warp. It is more preferable that $CS_0$ be 500 MPa or larger, further preferably 600 MPa or larger. Whereas the strength increases as $CS_0$ becomes larger, a violent fracture may occur in the case where $CS_0$ is too large. Thus, $CS_0$ is preferably 1,200 MPa or smaller, more preferably 1,000 MPa.

It is preferable that the DOL of the present strengthened glass be 70 μm or larger because in that case it does not fracture easily even if a scratch is formed in its surface. It is more preferable that the DOL be 100 μm or larger. Although the present strengthened glass is less prone to fracture as its DOL increases even if a scratch is formed, the DOL cannot be made too large because internal tensile stress occurs according to compressive stress formed adjacent to the surface. It is preferable that the DOL be t/4 or smaller, more preferably be t/5 or smaller, where t is the thickness of the chemically strengthened glass. To shorten the time required for the chemical strengthening, it is preferable that the DOL be 200 μm or smaller, more preferably 180 μm or smaller.

It is preferable that the CT of the present strengthened glass be 110 MPa or smaller because in that case the degree of scattering of fragments is suppressed when the chemically strengthened glass fractures. It is more preferable that the CT be 100 MPa or smaller, further preferably 90 MPa or smaller. On the other hand, there is a tendency that the surface compressive stress decreases to make it difficult to obtain sufficient strength as the CT decreases. Thus, it is preferable that the CT be 50 MPa or larger, more preferably 55 MPa or larger and further preferably 60 MPa or larger.

It is preferable that the base composition of the present strengthened glass be such as to contain, in mol % in terms of oxides, 40% to 70% of $SiO_2$, 10% to 35% of $Li_2O$, and 4% to 15% of $Al_2O_3$.

The term "base composition of chemically strengthened glass" as used above means a composition before the chemical strengthening. The composition of the present strengthened glass is, as a whole, similar to the composition of glass before it is subjected to the chemical strengthening except for a case that extreme ion exchange treatment has been performed. In particular, the composition of a deepest portion that is most distant from the glass surface is the same as a composition before the strengthening except for a case that extreme ion exchange treatment has been performed.

The present glass and the present strengthened glass are useful when applied to a cover glass that is used in an electronic device such as a mobile device as exemplified by a cellphone, a smartphone, etc. Furthermore, they are useful when applied to a cover glass of an electronic device that is not intended to be portable such as a TV, a personal computer, and a touch panel, an elevator wall surface, and a wall surface (full-surface display) of a construction such as a house or a building. In addition, they are useful when applied to a construction material such as a window glass, a tabletop, an interior material or the like of an automobile, an airplane, or the like and a cover glass thereof, and a case or the like having a curved shape.

<Manufacturing Method of a Glass Having a Curved Shape>

«Manufacturing Method of Amorphous Glass»

Amorphous glass can be manufactured by an ordinary method. For example, materials of respective glass components are mixed together and heat-melted in a glass melting furnace. Subsequently, resulting glass is homogenized by a known method, shaped into a desired shape (e.g., into a glass sheet), and annealed. In the case where a glass sheet is to be formed, the glass may be shaped into a sheet shape by a float method, a press method, a down draw method, or the like. Alternatively, the glass may be shaped into a sheet shape by the method in which molten glass may be shaped into a block, annealed the block shaped glass, and then cut it.

Examples of method for mixing particles into amorphous portion of glass include a method for obtaining crystallized glass by subjecting the above-described amorphous glass to heating treatment by a method to be described below, and a method of mixing desired particles when heat-melting glass materials in a glass melting furnace in the above amorphous glass manufacturing method.

«Manufacturing Method of Crystallized Glass»

Crystallized glass is obtained by precipitating crystal particles from amorphous portion by performing heating treatment on the amorphous glass obtained according to the above procedure. The heating treatment may be two-step heating treatment including increasing the temperature from room temperature to a first processing temperature, holding the temperature for a prescribed time, and then maintaining a second processing temperature that is higher than the first processing temperature for a prescribed time. Alternatively, the heating treatment may be one-step heating treatment of maintaining a particular processing temperature and then lowering the temperature to room temperature.

In the case of the two-step heating treatment, it is preferable that the first processing temperature be in a temperature range in which the crystal nuclei growth rate is high with a current glass composition and the second processing temperature be in a temperature range in which the crystal growth rate is high with a current glass composition. It is preferable that the first processing temperature holding time be long enough to allow generation of a sufficient number of crystal nuclei. In the case where a large number of crystal nuclei are generated, individual crystals are made small in size and highly transparent crystallized glass can thereby be obtained.

The two-step heating treatment may be such that the first processing temperature that is in a range of, for example, 500° C. to 700° C. is maintained for 1 hour to 6 hours and then the second processing temperature that is in a range of, for example, 600° C. to 800° C. is maintained for 1 hour to 6 hours. The one-step heating treatment may be such that a temperature that is in a range of, for example, 500° C. to 800° C. is maintained for 1 hour to 6 hours.

A crystallized glass sheet is formed by grinding and polishing crystallized glass obtained according to the above procedure when necessary. In the case where the crystallized glass sheet is to be chamfered or cut into a prescribed shape or size, it is preferable to perform cutting or chamfered processing before chemical strengthening treatment because in that case a compressive stress layer is also formed on each end surface by the later chemically strengthening treatment.

«Shaping»

In the case where the present glass has a curved shape, it is preferable to perform chemical strengthening after a curved surface is formed by bend shaping with application of external force, after manufacture of a sheet-shaped glass (glass sheet). Although there are no particular limitations on the strength of the external force, the external force is preferably 8 kN or weaker, more preferably 6 kN or weaker, and further preferably 2 kN or weaker, for example. Stress tends to be relieved easily in the present glass and it is superior in formability because a difference exists between local viscosity and bulk viscosity and the loss tangent is small. Thus, cracking due to increase in the external force can be suppressed.

Examples of bend shaping method include a self-weight shaping method, a vacuum shaping method, and a press shaping method. Two or more kinds of bend shaping methods may be used in combination. In any case, a die made of carbon is used widely as a molding die.

The self-weight shaping method is a method of setting a glass sheet on a molding die, softening the glass sheet by heating it, and causing the glass sheet to fit the molding die by gravity.

The vacuum shaping method is a method in which a glass sheet is set on a molding die and is given sealing around it and then bend shaping is performed by reducing the pressure of the space between the molding die and the glass sheet. In this case, the pressure on the side of the top surface of the glass sheet may be increased.

The press shaping method is a method in which a glass sheet is set between a top molding die and a bottom molding die, and bend-shaped into a prescribed shape by applying a press load between the top molding die and the bottom molding die while heating the glass sheet.

Examples of heating method of the press molding include a method of heating the glass sheet by bringing a heater plate kept at a high temperature into contact with the surfaces of the top molding die and the bottom molding die, and a method of heating the glass sheet by arranging heaters around the molding dies.

From the viewpoint of suppressing physical property changes caused by shaping, it is preferable that the change in crystallinity caused by shaping of crystallized glass be 10% or smaller, more preferably 5% or smaller and further preferably 1% or smaller.

The change in crystallinity caused by shaping of crystallized glass can be adjusted by changing the shaping temperature and the shaping time.

In the present glass, in the case where a curved surface is formed by applying external force while the temperature is kept in a range in which the logarithm log $\eta$ (dPa·s) of bulk viscosity $\eta$ (dPa·s) is 11.4 or larger and 12.7 or smaller, it is preferable that the area of transfer marks detected in a transmission light image be 0% to 5% of the entire shaped area, more preferably 0% to 3% of the entire shaped area. The present glass exhibits superior surface quality in the case where the area of transfer marks is 0% to 5% of the entire shaped area.

In the above shaping step, the bend shaping may be performed at the same time as the heating. Either radiation-type heating or contact-type heating may be performed at the time of the bend shaping. In the case where a temperature difference is to be set between a temperature for shaping into a curved shape and a temperature for shaping into a flat shape, local heating may either be performed or not be performed.

«Chemically Strengthening Treatment»

The chemically strengthening treatment is typically performed by bringing glass into contact with a metal salt by, for example, a method of immersing the glass in a melt of the metal salt of potassium nitrate or the like containing metal ions having a large ion radius such as Na ions or K ions. As a result, metal ions having a small ion radius in the glass are replaced by metal ions having the large ion radius, that is, ion exchange occurs. In the ion exchange, for example, Li ions are replaced by Na ions or K ions, and Na ions are replaced by K ions.

To increase the rate of the chemically strengthening treatment, it is preferable to employ "Li—Na exchange" in which Li ions in the glass are replaced by Na ions. To produce a large compressive stress by ion exchange, it is preferable to employ "Na—K exchange" in which Na ions in the glass are replaced by K ions.

Examples of molten salts to be used for the chemically strengthening treatment include nitrate salts, sulfate salts, carbonate salts, and chlorides. Among these, examples of nitrate salt include lithium nitrate, sodium nitrate, potassium nitrate, cesium nitrate, and silver nitrate. Examples of sulfate salt include lithium sulfate, sodium sulfate, potassium sulfate, cesium sulfate, and silver sulfate. Examples of carbonate salt include lithium carbonate, sodium carbonate, and potassium carbonate. Examples of chloride include lithium chloride, sodium chloride, potassium chloride, cesium chloride, and silver chloride. These molten salts may be used either singly or in the form of a combination of plural kinds.

As for the treatment conditions of the chemically strengthening treatment, a proper time, temperature, etc. can be selected taking a glass composition, a kind of molten salt, etc. into consideration. For example, the present glass is subjected to chemically strengthening treatment preferably at 450° C. or lower and preferably for 1 hour or shorter. A specific example treatment is that the glass is immersed in a molten salt (e.g., a mixed salt of lithium nitrate and sodium nitrate) containing Li at 0.3 mass % and Na at 99.7 mass % and preferably having a temperature of 450° C. for preferably about 0.5 hour.

For example, in the chemically strengthening treatment, two-step ion exchange may be performed in the following manner. First, the present crystallized glass is immersed in a metal salt (e.g., sodium nitrate) containing Na ions that is preferably kept at 350° C. to 500° C. for preferably about 0.1 hours to 10 hours. As a result, ion exchange occurs between Li ions in the crystallized glass and Na ions in the metal salt, thereby forming a relatively deep compressive stress layer.

Subsequently, the crystallized glass is immersed in a metal salt (e.g., potassium nitrate) containing K ions that is preferably kept at 350° C. to 500° C. for preferably about 0.1 hours to 10 hours. As a result, a large compressive stress is produced in, for example, a portion of about 10 μm in depth of the compressive stress layer that was formed by the preceding step. This kind of two-step treatment makes it easier to obtain a stress profile having a large surface compressive stress value.

EXAMPLES

Although the invention will be hereinafter described using Examples, the present invention is not restricted by them.

<Evaluation Methods>

(Specific Gravity ρ)

A specific gravity of glass was measured by the Archimedes method. Results are shown in the row "ρ (g/cm$^3$)" of Table 1.

(Glass Transition Temperature Tg)

Glass was ground or pulverized using an agate mortar, about 80 mg of the resulting powder was put into a platinum cell, and a glass transition temperature Tg was determined by measuring a DSC curve using a differential scanning calorimeter ("DSC3300SA" produced by Bruker Corporation) while increasing the temperature from room temperature to 1,100° C. at a temperature increase rate 10° C./min. Results are shown in the row "Tg" of Table 1.

(Haze Value)

A C light source haze value (unit: %) of glass was measured using a haze meter ("HZ-V3" produced by Suga Test Instruments Co., Ltd.). Results are shown in the row "haze (%)" of Table 1.

(Young's Modulus E)

A Young's modulus of glass was measured by the ultrasonic method. Results are shown in the row "E (GPa)" of Table 1.

(Fracture Toughness Value Kc)

A fracture toughness value of glass was measured by the IF method according to JIS R1607: 2015. Results are shown in the row "Kc (MPa·m$^{1/2}$)" of Table 1.

(X-Ray Diffraction: Precipitated Crystals)

Precipitated crystals were identified by performing a powder X-ray diffraction measurement on glass under the following conditions. Results are shown in the row "crystal" of Table 2.

Measuring instrument: "Smart Lab" produced by Rigaku Corporation

X-ray used: CuKα ray

Measurement range: 2θ=10° to 80°

Rate: 10°/min

Step: 0.02°

(Measuring Method of Bulk Viscosity η)

Viscosity of the entire glass was measured by the fiber elongation method according to JIS R3103-2 (2001). The logarithm of bulk viscosity η at the time of shaping is shown in the row "viscosity log η at the time of shaping" of Table 2.

(Measuring Method of Local Viscosity η)

Viscosity of amorphous portion, that is, glass local viscosity $\eta_0$, was calculated according to the above-mentioned Equation (1) (Mori-Ototake equation) or Equation (2) (Brinkman equation) from the degree of crystallinity. The logarithm of a value obtained was taken, and a value of log η−log $\eta_0$ in a temperature range in which log η was 11.4 or larger and 12.7 or smaller is shown in Table 2.

(Measuring Method of Loss Tangent Tan δ)

A loss tangent tan δ of glass was measured in a shear measurement mode at a frequency of 1.0 Hz under the conditions of a strain amount of 0.01% and a temperature increase rate of 10° C./min using a dynamic viscoelasticity measuring instrument "MCR502" (rheometer)/"CTD-1000" (temperature adjusting system) produced by Anton Paar GmbH. A glass sample having a size 35 mm (vertical)×8 mm (horizontal)×2 mm (thickness) was used. A peak value of tan δ at 1 Hz is shown in Table 2.

(Δ log η/ΔT)

Δ log η/ΔT (dPa·s/K) in a temperature range in which the logarithm log $\eta_0$ (dPa·s) of bulk viscosity η was 11.4 or larger and 12.7 or smaller was determined. Results are shown in Table 2.

(Log η at Temperature at which Crystal Nuclei Growth Rate Takes a Peak Value)

A temperature at which the crystal nuclei growth rate takes a peak value was measured by a DSC under the following conditions, bulk viscosity η was measured by the above-described bulk viscosity η measuring method, and log η at this temperature was calculated. Results are shown in Table 2.

Instrument: "DSC3300SA" produced by Bruker Corporation

Sample: powder

Measurement conditions: The temperature was increased from room temperature to a measurement temperature (basically 1,100° C. in the case of crystallized glass) at a rate of 10° C./min.

(Particle Diameter)

A precipitated crystal (main crystal) was identified by performing powder X-ray diffraction on glass under the following conditions. Results are shown in the row "crystal" of Table 2.

Furthermore, a volume fraction (unit: %) of particles and a crystal particle diameter (crystal size) (unit: nm) were calculated using the Rietveld method. Results are shown in Table 2. It is noted that the "crystal particle diameter" means the term "diameter of at least one particle" in Table 2.

Measuring instrument: "Smart Lab" produced by Rigaku Corporation

X-ray used: CuKα ray

Measurement range: 2θ=10° to 80°

Rate: 10°/min

Step: 0.02°

(Particle Shape, (Longer Axis Length)/(Shorter Axis Length))

A shape of particles contained in glass and their (longer axis length)/(shorter axis length) were respectively observed and calculated by observing an external shape of lattice-fringe-observed particles found in a cryo-TEM image obtained under the following conditions. Results are shown in the rows "particle shape" and "(longer axis length)/(shorter axis length) of particles" of Table 2.

Measuring instrument: a transmission electron microscope (TEM) "Titan" (trademark) produced by Thermo Fisher Scientific K.K.

Field of view: 300 nm (Surface Roughness Ra)

Surface roughness of glass was measured by the following method. Arithmetic average roughness Ra was employed as a measurement index. A measurement was carried out in accordance with JIS B0601: 2001. Results are shown in the row "surface roughness Ra (μm)".

Measuring instrument: "NH-3MAS" produced by Mitaka Kohki Co., Ltd.

Measurement pitch: 0.4 μm

Measurement length 5,000 μm;

Cutoff value: 0.08 mm (Deviation from Design Shape)

Deviation from a design shape of glass shape was evaluated by the following method.

Differences between a shape of a shaped product acquired using a three-dimensional measuring instrument "Atos" produced by GOM Metrology and a design shape was measured. Results are shown in the row "deviation from design shape" of Table 2.

(Occurrence of Fracture)

Occurrence/non-occurrence of fracture in glass was evaluated according to the following criteria. Results are shown in the row "occurrence of fracture" of Table 2.

Occurrence of fracture: A crack that was 0.5 mm or longer was found in a transmission light image.

Non-occurrence of fracture: No such crack was found in a transmission light image.

(Transmission Image)

A proportion (%) of a transfer mark area was measured by shining point light (white light) on a shaped glass sample, acquiring a transmission image, and binarizing it. Results are shown in the row "proportion of transfer mark area" of Table 2.

<Manufacture and Evaluation of Amorphous Glass>

Glass materials were mixed together so as to obtain each of glass compositions in mass % in terms of oxides that are shown in Table 1 and weighing was done to obtain 800 g of glass. Subsequently, mixed glass materials were put into a platinum crucible, melted for about 5 hours in an electric furnace whose temperature was kept at 1,400° C. to 1,700° C., and then defoamed and homogenized.

Molten glass thus obtained was cast into a die, kept at a temperature that was higher than a glass transition temperature by about 30° C. for 1 hour, and cooled to room temperature at a rate of 0.5° C./min, thereby obtaining a glass block. A glass transition temperature, a specific gravity, a Young's modulus, and a fracture toughness value of amorphous glass were evaluated using a portion of the thus-obtained block. Results are shown in Table 1.

In Table 1, symbol means "unevaluated." In Table 1, "$R_2O$" means the sum of contents of $Li_2O$, $Na_2O$, and $K_2O$ and "NWF" means the sum of contents of $SiO_2$, $Al_2O_3$, $P_2O_5$, and $B_2O_3$.

TABLE 1

| | | G1 | G2 | G3 | G4 | G5 | G6 |
|---|---|---|---|---|---|---|---|
| Glass composition (mol %) | $SiO_2$ | 50.0 | 66.2 | 71.3 | 72.0 | 70.1 | 61.0 |
| | $Al_2O_3$ | 5.0 | 11.2 | 14.4 | 1.1 | 4.3 | 5.0 |
| | $P_2O_5$ | 2.3 | 0.0 | 0.7 | 0.0 | 0.8 | 2.0 |
| | $B_2O_3$ | 0.0 | 0.0 | 0.0 | 0.0 | 0.2 | 0.0 |
| | $Li_2O$ | 34.1 | 10.4 | 9.4 | 0.0 | 21.4 | 21.0 |
| | $Na_2O$ | 1.8 | 5.6 | 2.1 | 12.6 | 1.5 | 2.0 |
| | $K_2O$ | 1.2 | 1.5 | 0.0 | 0.2 | 0.0 | 0.0 |
| | $ZrO_2$ | 4.5 | 1.3 | 1.2 | 0.0 | 1.7 | 3.0 |
| | $SnO_2$ | 0.0 | 0.0 | 0.9 | 0.0 | 0.0 | 0.0 |
| | $Y_2O_3$ | 1.0 | 0.5 | 0.0 | 0.0 | 0.0 | 1.0 |
| | $R_2O$ | 37.1 | 17.5 | 0.0 | 0.0 | 0.0 | 0.0 |
| | CaO | 0.0 | 0.0 | 0.0 | 8.6 | 0.0 | 0.0 |
| | MgO | 0.0 | 3.1 | 0.0 | 5.5 | 0.0 | 5.0 |
| | NWF | 57 | 77 | 86 | 73 | 75 | 68 |
| | $R_2O/(SiO_2 + Al_2O_3)$ | 0.67 | 0.23 | 0.13 | 0.18 | 0.31 | 0.35 |
| | $R_2O$/NWF | 0.65 | 0.23 | 0.13 | 0.18 | 030 | 0.34 |
| Properties | ρ ($g/cm^3$) | 2.60 | 2.45 | 2.47 | 2.50 | 2.47 | 2.56 |
| | Tg | 494 | 549 | 902 | 560 | — | 516 |
| | Haze (%) | 0.08 | ≤0.05 | 0.05 | — | ≤0.20 | 0.03 |
| | E (GPa) | 104 | 84 | 90 | 73 | 105 | 95 |
| | Kc ($MPa \cdot m^{1/2}$) | 0.8 | 0.83 | — | — | 1.05 | 0.95 |

<Crystallization Treatment and Evaluation of Crystallized Glass)

The thus-obtained glass block was worked into a size of 70 mm×70 mm×1.5 mm and crystallized glass was obtained by performing heat treatment under the conditions shown in Table 2.

In each box, showing crystallization conditions, of the row "heat treatment" in Table 2, nuclei generation processing conditions are shown on the first line and crystal growth processing conditions are shown on the second line. For example, "550° C., 2 h" and "730° C., 2 h" shown on the first line and the second line, respectively, mean that the glass block was kept at 550° C. for 2 hours and then kept at 730° C. for 2 hours.

The crystallized glass thus obtained was worked and mirror-polished into a glass sheet having the thickness t of 0.55 mm. A curved glass having a curved shape was obtained by shaping the glass sheet into a prescribed shape by fitting it to a die and bending it. Evaluation results of the curved glass are shown in Table 2.

A concave die and a convex die that were made of carbon and designed so as to enable molding into a curved surface having a radius of curvature of 6.0 mm and a bend depth of 4.0 mm were prepared and a chamfered glass sheet was placed approximately at the center of a glass contact surface of the concave die.

The glass sheet was subjected to preliminary heating, deformation, and cooling in a state that the concave die in which the glass sheet was placed and the convex die were fixed to a bottom shaft and a top shaft, respectively, of a molding machine (a glass device molding machine "GMP-315V" produced by Toshiba Machine Co., Ltd.).

In the preheating step among the above steps, the temperature was increased from room temperature to 500° C. in 15 min. At 500° C., the balanced viscosity of the glass sheet was $10^{16}$ dPa·s. Then the temperature was increased from 500° C. to 630° C. in 5 min. The balanced viscosity of the glass sheet at 630° C. was about $10^{12.7}$ dPa·s.

The convex die was moved downward in a state that the temperature was kept in a range of 630° C. to 640° C. so that the balanced viscosity of a central portion of the glass sheet was kept in a range of $10^{125}$ dPa·s to $10^{12.7}$ dPa·s, thereby pressing the concave die at a maximum of 2,000 N for 3 min. During that course, nitrogen gas was blown in through penetration holes formed through the convex die at a rate of 20 L/min so that the glass sheet was molded uniformly.

Subsequently, annealing to 480° C. was done in 20 min. The balanced viscosity of the glass sheet at 480° C. was about $10^{17.5}$ dPa·s. Then the convex die was escaped by elevating it at a rate of 2 mm/sec and the glass sheet was allowed to cool down to room temperature.

Part of the remaining crystallized glass was ground or pulverized and used for analysis of precipitated crystals. Detected main crystals are shown in the row "crystal" of Table 2. Since discrimination between $Li_3PO_4$ and $Li_4SiO_4$ using power X-ray diffraction was difficult, both of them are shown. Evaluation results of each kind of crystallized glass are shown in Table 2. Symbol "-" means "unevaluated." Examples 1, 2 and 6-9 are Examples and Examples 3-5 are Comparative Examples.

TABLE 2

| | Example 1 | Example 2 | Example 3 | Example 4 | Example 5 |
|---|---|---|---|---|---|
| Glass | G1 | G1 | G2 | G3 | G4 |
| Heat treatment | 550° C., 2 h 730° C., 2 h | 550° C., 2 h 730° C., 2 h | None | 750° C., 4 h 920° C., 4 h | None |
| Presence/absence of particles mixed in amorphous portion | Present | Present | Absent | Present | Absent |
| Diameter of at least one particle | 10 nm or more | 10 nm or more | — | 120 nm or more | — |
| Particle shape | Spheroidal | Spheroidal | — | Spherical | — |
| (Longer-axis length)/shorter-axis length) of particle | 5.1 | 5.1 | — | 1 | — |
| Volume fraction of particles (%) | 40 | 40 | — | 78 | — |
| Crystal(s) | $Li_2SiO_3$ | $Li_2SiO_3$ | — | $LiAlSi_2O_6$ | — |
| logη-logη$_0$ in temperature range in which logη is 11.4 or larger and 12.7 or smaller | 0.792 | 0.792 | 0 | 1.64 | 0 |
| Δlogη/ΔT in temperature range in which logη is 11.4 or larger and 12.7 or smaller | −0.023 | −0.023 | −0.030 | −0.014 | −0.0431 |
| logη at temperature at which crystal nuclei growth rate takes peak | 11.0 | 11.0 | — | — | — |
| Timing of shaping | After crystal-lization | After crystal-lization | No crystal-lization | After crystal-lization | No crystal-lization |
| Shaping conditions | 620° C., 3 min | 660° C., 3 min | 575° C., 3 min | 1,050° C., 3 min | 586° C., 3 min |
| Viscosity logη at the time of shaping | 12.7 | 11.8 | 11.7 | 11 | 12 |
| Surface roughness Ra (μm) | 0.00433 | 0.0225 | 0.0415 | — | — |
| Deviation from design shape | 0.271 | 0.294 | 0.255 | — | — |
| Occurrence of fracture | None | None | None | Fracture | None |
| Proportion of transfer mark area | 1.0% | 32.9% | 55.4% | — | — |
| tanδ peak value at 1 Hz | 1.467 | 1.467 | 5.148 | — | 5.649 |

TABLE 2-continued

| | Example 6 | Example 7 | Example 8 | Example 9 |
|---|---|---|---|---|
| Glass | G6 | G5 | G5 | G5 |
| Heat treatment | 550° C., 2 h 750° C., 2 h | 540° C., 4 h 600° C., 4 h 650° C., 4 h | 540° C., 4 h 600° C., 4 h 670° C., 4 h | 570° C., 4 h 740° C., 1 h |
| Presence/absence of particles mixed in amorphous portion | Present | Present | Present | Present |
| Diameter of at least one particle | 10 mn or more | 10 mn or more | 10 mn or more | 19 mn or more |
| Particle shape | Spherical/spheroidal | Spherical/spheroidal | Spherical/spheroidal | Spheroidal |
| (Longer-axis length)/shorter-axis length) of particle | 1 or more | 1 or more | 1 or more | 1.21 |
| Volume fraction of particles (%) | 20 | 40 | 60 | 80 |
| Crystal(s) | $Li_3PO_4$, $Li_4SiO_4$, or their solid solution | $LiAlSi_4O_{10}$ $Li_2SiO_3$ | $LiAlSi_4O_{10}$ $Li_2SiO_3$ | $LiAlSi_4O_{10}$ $Li_2SiO_3$ |
| logη-logη$_0$ in temperature range in which logη is 11.4 | 0.296 | 0.792 | 0.995 | 1.74 |

TABLE 2-continued

| | | | | |
|---|---|---|---|---|
| or larger and 12.7 or smaller | | | | |
| Δlogη/ΔT in temperature range in which logη is 11.4 or larger and 12.7 or smaller | −0.035 | Unknown | Unknown | Unknown |
| logη at temperature at which crystal nuclei growth rate takes peak | 10.1 | Unknown | Unknown | Unknown |
| Timing of shaping | After crystal-lization | After crystal-lization | After crystal-lization | After crystal-lization |
| Shaping conditions | 563° C., 3 min | 615° C., 3 min | 637° C., 3 min | 739° C., 3 min |
| Viscosity logη at the time of shaping | 13 | Unknown | Unknown | Unknown |
| Surface roughness Ra (μm) | 0.001976 | 0.002915 | 0.01414 | 0.00617 |
| Deviation from design shape | 0.229 | 0.196 | 0.206 | 0.244 |
| Occurrence of fracture | None | None | None | None |
| Proportion of transfer mark area | 33.2% | 6.7% | 39.7% | 16.2% |
| tanδ peak value at 1 Hz | 4.797 | 1.03 | 0.89 | 0.745 |

As shown in Table 2, a viscosity variation due to a temperature variation in Examples 1 and 2 which are Inventive Examples was smaller than in the Comparative Examples. It is therefore seen that glass fracture due to bend shaping was not prone to occur in a high viscosity range and superior shape accuracy and surface quality were obtained.

For the glass (Example 8) that was obtained from the glass G5 by changing the crystallinity to 60% and performing heat treatment under the conditions of the Inventive Example and Table 2, the difference (log η−log $\eta_0$ (dPa·s)) between log η (dPa·s) and the logarithm log $\eta_0$ (dPa·s) of local viscosity $\eta_0$ (dPa·s) in a temperature range in which log η (dPa·s) was 11.4 or larger and 12.7 or smaller was measured to be 1.0.

Likewise, for the glass (Example 9) that was obtained from the glass G5 by changing the crystallinity to 80% and performing heat treatment under the conditions of the Inventive Example and Table 2, the difference (log η−log $\eta_0$ (dPa·s)) between log η (dPa·s) and the logarithm log $\eta_0$ (dPa·s) of local viscosity $\eta_0$ (dPa·s) in a temperature range in which log η (dPa·s) was 11.4 or larger and 12.7 or smaller was measured to be 1.74. In manufacturing a glass having a curved shape, a glass in which glass fracture due to bend shaping is not prone to occur in a high viscosity range and that exhibits superior shape accuracy and surface quality was manufactured successfully even if a measured value of the difference (log η−log $\eta_0$ (dPa·s)) between log η (dPa·s) and the logarithm log $\eta_0$ (dPa·s) of local viscosity $\eta_0$ (dPa·s) in a temperature range in which log η (dPa·s) was 11.4 or larger and 12.7 or smaller was in a range of 1.0 to 1.74.

Although the invention has been described in detail by referring to the particular embodiments, it is apparent to those skilled in the art that various changes and modifications are possible without departing from the spirit and scope of the invention. The present application is based on Japanese Patent Application No. 2020-141160 filed on Aug. 24, 2020, the disclosure of which is incorporated herein by reference.

The invention claimed is:

1. A glass wherein:

the glass is a crystallized glass;

the glass has a difference log η−log $\eta_0$ (dPa·s) between a logarithm log η(dPa·s) of bulk viscosity η (dPa·s) defined below and a logarithm log $\eta_0$ (dPa·s) of local viscosity no (dPa·s) defined below of larger than 0 and 1.8 or smaller, in a temperature range in which the logarithm log η(dPa·s) of the bulk viscosity η (dPa·s) is 11.4 or larger and 12.7 or smaller, bulk viscosity η: viscosity of the entire glass measured by a penetration method or a parallel plate method, local viscosity $\eta_0$: viscosity of an amorphous portion of the glass determined according to the following Equation (1) in a case where a crystallinity of the glass is 0.4 or lower, and according to the following Equation (2) in a case where the crystallinity of the glass is larger than 0.4, from the bulk viscosity and a volume fraction of particles; and in the following Equation (1), d is an average particle diameter, $S_r$ is a specific surface area of particles per unit volume, $\phi_v$ is a volume concentration, and $\phi_{ve}$ is a marginal maximum volume concentration; in the following Equation (2), $\phi_v$ is a volume concentration; and in each of the following Equations (1) and (2), in a case of a crystallized glass, the volume concentration represented by $\phi_v$ means crystallinity:

$$\frac{\eta}{\eta_0} = 1 + \frac{d \cdot S_r}{2} \cdot \frac{1}{1/\varphi_v - 1/\varphi_{vc}} = 1 + \frac{3}{1/\varphi_v - 1/0.52} \quad (1)$$

$$\frac{\eta}{\eta_0} = (1 - \varphi_v)^{-2.5}. \quad (2)$$

2. The glass according to claim 1, wherein the difference log η−log $\eta_0$ (dPa·s) is 0.1 or larger and 1.2 or smaller.

3. The glass according to claim 1, wherein the difference log η−log $\eta_0$ (dPa·s) is 0.1 or larger and 0.8 or smaller.

4. The glass according to claim 1, wherein the difference log η−log $\eta_0$ (dPa·s) is 0.2 or larger and 0.6 or smaller.

5. The glass according to claim 1, wherein the glass has a slope Δ log η/ΔT (dPa·s/K) of the logarithm log η(dPa·s) of bulk viscosity η (dPa·s) defined below is −0.035 or larger:

bulk viscosity η: viscosity of the entire glass measured by a penetration method or a parallel plate method.

6. The glass according to claim 1, wherein the logarithm log η (dPa·s) of the bulk viscosity η (dPa·s) at a temperature at which a crystal nuclei growth rate takes a peak value is 11.4 is smaller.

7. The glass according to claim 1, wherein the glass is used as a cover glass.

8. A chemically strengthened glass obtained by chemically strengthening the glass according to claim 1.

* * * * *